(12) United States Patent
Böhm et al.

(10) Patent No.: US 6,517,937 B2
(45) Date of Patent: Feb. 11, 2003

(54) SELF-ADHESIVE PROTECTIVE FILM ESPECIALLY FOR PAINTED VEHICLES OR VEHICLE PARTS

(75) Inventors: Nicolai Böhm, Hamburg (DE); Jobst Waldemar Klemp, Schenefeld (DE); Ingolf Schütz, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/784,243

(22) Filed: Feb. 15, 2001

(65) Prior Publication Data

US 2001/0024721 A1 Sep. 27, 2001

(30) Foreign Application Priority Data

Feb. 16, 2000 (DE) .......................................... 100 07 060

(51) Int. Cl.$^7$ ............................................... B32B 27/32
(52) U.S. Cl. .............................. 428/355 EN; 428/343; 428/354; 428/355 BL
(58) Field of Search .......................... 428/355 EN, 343, 428/354, 355 BL

(56) References Cited

U.S. PATENT DOCUMENTS

| | | | |
|---|---|---|---|
| 5,601,917 A | 2/1997 | Matsu et al. ................. | 428/356 |
| 5,612,136 A | 3/1997 | Everaerts et al. ........... | 428/355 |
| 5,660,922 A * | 8/1997 | Herridge et al. ............. | 428/214 |
| 5,895,714 A | 4/1999 | Malek ......................... | 428/337 |
| 5,925,456 A | 7/1999 | Malek | |
| 6,221,448 B1 * | 4/2001 | Baetzold et al. ............ | 428/35.2 |

FOREIGN PATENT DOCUMENTS

| | | | |
|---|---|---|---|
| DE | 195 32 220 | 3/1996 | .............. C09J/7/02 |
| DE | 197 42 805 | 1/1999 | .............. C09J/7/00 |
| EP | 0 519 278 | 12/1992 | .............. C09J/7/02 |
| EP | 0 761 315 A2 | 3/1997 | |
| EP | 0 763 584 | 3/1997 | .............. C09J/7/02 |
| EP | 0 826 754 A2 | 3/1998 | |
| EP | 0 905 209 A1 | 3/1999 | |
| WO | 96/37568 | 11/1996 | .............. C09J/7/02 |

OTHER PUBLICATIONS

Specification of U.S. Ser. No. 09/156886.
Patent Abstracts of Japan, publication No. 09–165559, (Jun. 24, 1997) (Hitachi Chem Co LTD).
Patent Abstracts of Japan, publication No. 08–027444 (Jan. 30, 1996) (Sekisui Chem Co LTD).

* cited by examiner

Primary Examiner—Robert Dawson
Assistant Examiner—Christopher M. Keehan
(74) Attorney, Agent, or Firm—Norris McLaughlin & Marcus

(57) ABSTRACT

A self-adhesive protective film, especially for painted vehicles or vehicle parts, having a single-ply or multi-ply backing layer and an adhesive layer, the adhesive layer comprising a polar component A and an apolar component B, the weight fraction of the polar component A being from 50 to 99% and comprising one or a mixture of copolymers of ethylene and vinyl acetate whose vinyl acetate content is between 40 and 80% by weight, and the weight fraction of the apolar component B being from 1 to 50% and comprising one or a mixture of slightly crystalline or amorphous homopolymers or copolymers of α-olefins of 2 to 12 carbon atoms, said polymers being saturated in the main chain.

11 Claims, No Drawings

SELF-ADHESIVE PROTECTIVE FILM ESPECIALLY FOR PAINTED VEHICLES OR VEHICLE PARTS

The invention relates to a protective film whose great weathering stability and adhesion reliability make it especially suitable for temporarily protecting fresh automobile finishes from soiling and damage, as well as for other sensitive surfaces such as metals, plastics and glazing.

The preservation and protection of motor vehicles in the course of transportation from manufacturer to dealer has long been common practice.

The conventional method of preserving automobiles is to apply paraffin waxes in a thickness of from 5 to 20 $\mu$m. However, it has been found that, especially on horizontal areas of the vehicles, such as the hood, roof and trunk lid, a thin and usually nonuniform layer of this nature does not afford adequate protection against external influences, such as the corrosive effect of bird droppings, for example.

A considerable disadvantage of sealing with paraffin wax is the need to remove the preservative using a steam jet, surfactants or solvents. Environmentally sound recovery and disposal of the residues are the cause of great complexity in terms of apparatus, and of very high costs.

A current development in the field of automotive transit protection is the use of covers which go over the entire vehicle and are shrunk on to fit by exposure to heat. Cover solutions of this kind are very costly and involve a great deal of effort in applying the cover, effecting shrinkage, and especially when climbing into the masked automobile. For that particular purpose, zip fastener openings are provided, whose necessary opening and reclosing is time-consuming. Visibility when parking is severely impaired, and there are areas of dulling on the finish as a result of enclosed dirt and unavoidable scuffing. This solution cannot become widespread.

Instead, increasing use is being made of temporarily applied self-adhesive surface protective films. These are specifically intended for the mechanical and chemical protection of fresh motor vehicle finishes, have a protective action which is much better than that of the waxes, and have the advantage over the covers of being more cost effective and significantly quicker to apply.

A key requirement of a surface protective film is its weathering stability over a period of more than six months. Accordingly, even after six months of intense sunlight exposure, such a film must be removable in one piece and must not leave any residues of adhesive composition on the finish. Moreover, it must have a sufficient initial tack, so as not to detach of itself prematurely in situations of difficult bonding geometry, but at the same time must not have too great an ultimate bond strength to the finish, so that the film can be removed without substantial force being applied and certainly without tearing.

In accordance with the prior art, therefore, film materials used are generally polyolefins or mixtures thereof which are normally blended with light stabilizers and titanium dioxide.

A diversity of systems are used as self-adhesive compositions, but are without exception hampered by weaknesses.

Self-adhesive compositions based on natural rubber possess relatively good initial adhesion and can be removed again without residue. Even on short-term exposure to UV radiation, however, these compositions are not stable to aging. Following realistic weathering exposures over a period of several months, this leads to severe greasy residues or hardened paintlike residues on the finish.

U.S. Pat. No. 5,612,136 mentions a protective film having an acrylate-based self-adhesive composition. Polyacrylate compositions are indeed highly UV-stable. If, however, uncrosslinked polyacrylate compositions are stored under alternating climatic conditions, their compatibility with paint surfaces is good only in some cases. Compatibility denotes that the paint surface shows no deformation whatsoever after the adhesive tape is removed. Moreover, these compositions exhibit an undesirable level of peel increase. Where these compositions are strongly crosslinked chemically or by radiation, they are indeed easier to remove but on the other hand cause increased incidence of permanent deformations of the paint surface which are clearly visible.

Self-adhesive compositions based on polyisobutylene (polyisobutylene homopolymer or butyl rubber) exhibit little adhesion to finishes customary in the automotive industry following storage under alternating climatic conditions. Under jerky stresses, such as on flapping in the slipstream, the adhesion is so low that the bond strength required in the art is not always present to a sufficient extent. Under the influence of moisture, in particular, the adhesion is often reduced to such an extent that the film detaches from the protected vehicles in the course of transit, resulting firstly in a loss of protection and secondly in a safety risk if it drifts onto the windshield of following vehicles. Furthermore, these adhesives are not very cohesive and therefore produce residues of composition when the film is removed, especially in the edge region after UV aging. Moreover, this self-adhesive composition is not compatible with the sealing profiles customary in automobile construction or with the plasticizers they contain: when the protective film is removed from window profiles, residues of the adhesive remain on the rubber. Adhesive articles of this kind are described in EP 0 519 278, JP 95-325285 and U.S. Pat. No. 5,601,917.

Substantially more UV-stable than polyisobutylenes are adhesives produced from hydrogenated styrene-diene block copolymers, whose use is described in JP 827 444. An important disadvantage of such block copolymers is their thermally reversible crosslinking by way of the styrene domains. If an adhesive film produced from them is removed in the summer from a vehicle which has become hot in the sun, the adhesive largely remains adhering to the finish, since the cohesion of the adhesive compositions is lower than the adhesion to the finish. Heating always leads to the shrinkage of the protective film, and so the adhesive, soft in the heat, smears onto the metal at the retreating edges of the adhesive film.

The adhesive film described in DE 195 32 220 A1, comprising ethylene-vinyl acetate (EVAc) adhesive, is significantly superior in adhesion to the systems described above. With the exception of one-component PU systems, there is no effect on the finishes to be protected. During removal after use, however, this adhesive film has a bond strength which is much too high, as a result of which it is in many cases impossible to remove the adhesive film without tearing. This increase in bond strength when the adhesive composite is stored, referred to by the skilled worker as peel increase, is caused by interactions of the adhesive, especially polar forces, with the finish. On the other hand, polar comonomers such as acrylate or vinyl acetate give rise to the desired high initial adhesion.

WO 96/37568A1 describes the use of polyhexene and/or polyoctene for a nonpolar pressure-sensitive adhesive. Because of the low cohesion, the polymers described in the examples do in fact exhibit little peel increase, but these polymers, owing to the low molecular weight of commercial polymers of this kind, likewise lead to residues, which it is attempted to avoid by adding other polymers, referred to therein as "cold flow restricting agents". For practical purposes, nevertheless, these adhesives are of inadequate cohesion, which leads to residues after weathering, especially if the adhesive tape shrinks under the effect of heat. A similar phenomenon is displayed by ethylene-propylene-diene copolymers (EPDM) as specified in DE 197 42 805. These, furthermore, exhibit very limited initial adhesion.

It is an object of the invention to provide a self-adhesive protective film, especially for fresh automobile finishes, which does not have (or not to the same extent) the above-described disadvantages of the prior art. In particular, the self-adhesive protective film should possess not only a pronounced initial bond strength but also a balanced (not too strong) ultimate bond strength, freedom from residues on removal, and finish compatibility.

This object is achieved by a self-adhesive protective film as specified in the main claim. The subclaims relate to advantageous developments of the self-adhesive protective film, particular possibilities for use, and a particularly advantageous process for preparing the surface protective film.

The invention accordingly provides a self-adhesive protective film, especially for painted vehicles or vehicle parts, having a single-ply or multi-ply backing layer and an adhesive layer comprising a mixture of synthetic rubbers,
a) the adhesive layer comprising a polar component A and an apolar component B,
b) the weight fraction of the polar component A being from 50 to 99% and comprising one or a mixture of copolymers of ethylene and vinyl acetate whose vinyl acetate content is between 40 and 80% by weight, and
c) the weight fraction of the apolar component B being from 1 to 50% and comprising one or a mixture of slightly crystalline or amorphous homopolymers or copolymers of α-olefins of 2 to 12 carbon atoms, said polymers being saturated in the main chain.

In the self-adhesive protective film, especially for painted vehicles or vehicle parts, having a single-ply or multi-ply backing layer and an adhesive layer, the weight fraction of the apolar component B may be from 1 to 50% and comprise copolymers of α-olefins of 2 to 12 carbon atoms and nonconjugated dienes.

The backing layer of the adhesive is a thermoplastic polyolefin film which in another advantageous embodiment is unoriented. Furthermore, it preferably comprises at least one polyolefin from the group of the polyethylenes (for example, HDPE, LDPE, MDPE, LLDPE, VLLDPE, copolymers of ethylene with polar comonomers) and/or from the group of the polypropylenes (for example, polypropylene homopolymers, polypropylene random copolymers or polypropylene block copolymers).

Preference is given to using mixtures of different suitable polyolefins in order to allow optimum adjustment of the mechanical and thermal properties and also of gloss, extrusion behavior, anchoring of the adhesive, etc.

For the backing films, a thickness of from 20 to 80 µm is preferred. The softness of the backing film plays a part in connection with the deformability during the application of the protective film; the force at 10% elongation should not exceed 25 N/15 mm, preferably 16 N/15 mm, both in the lengthwise and in the transverse direction (tensile test in accordance with DIN EN ISO 527-7-5). Therefore, the backing films should be unoriented. Orientation raises the force at 10% elongation so greatly that the film is no longer assured of conformability.

In order to give the backing film the required weathering stability, it is necessary to add light stabilizers. Their function consists primarily in preventing the embrittlement of the backing film. Light stabilizers of this kind are described in Gaechter and Müller, Taschenbuch der Kunststoff-Additive, Munich 1979, in Kirk-Othmer (3rd ed.) 23, 615-627, in Encycl. Polym. Sci. Technol. 14, 125–148 and in Ullmann (4th ed.) 8, 21; 15, 529, 676. In particular, HALS light stabilizers such as, for example, dimethyl succinate polymer with 4-hydroxy-2,2,6,6-tetramethyl-1-piperidineethanol (CAS No. 65447-77-0), bis(2,2,6,6-tetramethyl-4-piperidyl) sebacate (CAS No. 52829-07-9) or poly[[6-[(1,1,3,3-tetramethylbutyl)amino]-1,3,5-triazine-2,4-diyl][[(2,2,6,6-tetramethyl-4-piperidyl)imino] hexamethylene [(2,2,6,6-tetramethyl4-piperidyl)imino]] (CAS No. 70624-18-9) are suitable for the protective film of the invention. The amount of the light stabilizer should be at least 0.15% by weight, preferably at least 0.30% by weight, based on the backing film.

The use of antioxidants for the film (for example, Irganox 1010 or trisnonylphenyl phosphite) is advantageous but not absolutely necessary. Further suitable UV absorbers, light stabilizers and aging inhibitors are set out in EP 0 763 584 A1. Accordingly, antioxidants which may be used include N,N-di-2-naphthyl-p-phenylenediamine, 2,5-di(t-amyl) hydroquinone, trimethyidihydroquinoline polymer and 6-ethoxy-2,2,4-trimethyl-1,2-dihydroquinoline, 2,6-di-t-butyl-p-cresol, 2,2'-methylenebis-(4-methyl-6-t-butylphenol), 4,4'-butylidenebis(3-methyl-6-t-butylphenol), 4,4'-thiobis-(3-methyl-6-t-butylphenol), stearyl beta-(3,5-di-t-butyl4-hydroxyphenyl)propionate, tetrakis[methylene-3-(3',5'-di-t-butyl-4'-hydroxyphenyl)propionate]methane, 1,3, 5-tri-methyl-2,4,6-tris(3,5-di-t-butyl-4-hydroxybenzyl) benzene and 1,1,3-tris(2-methyl-4-hydroxy-5-t-butylphenol)butane, dilauryl thiodipropionate, distearyl thiodipropionate, lauryl stearyl thiodipropionate and dimyristyl thiodipropionate, triisodecyl phosphite, diphenyl isodecyl phosphite triphenyl phosphite and trinonyl phosphite and also N-salicyloyl-N'-aldehyde hydrazine, N-salicyloyl-N'-acetylhydrazine, N,N'-diphenyl-oxamide and N,N'-di-(2-hydroxyphenyl)oxamide.

An additional improvement in the light stability of the backing film is also possible by adding titanium dioxide. Advantageous in terms of mechanical properties and the homogeneity of the whiteness are from 5 to 15% by weight additions of titanium dioxide.

The UV permeability of the protective film in the region from 290 to 360 nm is preferably less than 1%, more preferably less than 0.1%, owing to the interaction of light stabilizers and pigments.

Suitable compounds for the polar component of the adhesive composition are ethylene-vinyl acetate grades (EVAc) whose VAc fraction is between 40 and 80% by weight, preferably between 50 and 70% by weight. It is also possible to mix different EVAc grades. Compounds suitable for the apolar component are poly-α-olefins such as polyisobutylene (PIB), poly-1-butene (PB), ethylenepropylene copolymers (EPM), ethylenepropylene-diene terpolymers (EPDM), the diene being nonconjugated, poly-1-hexene, poly-1-octene and other slightly crystalline or amorphous copolymers of ethylene and α-olefins of 4–12 carbon atoms. The apolar polymers may also be mixed in order to provide optimum properties.

The protective films produced in this way possess, on the one hand, good adhesion to a variety of finishes common in the automotive industry, which is retained under the effect of moisture or humid conditions, so that the protective film does not detach from the vehicle even under wind exposure or under tension caused by bonding to curved surfaces. Moreover, the self-adhesive composition possesses a sufficient bond strength within the first few minutes after application, so that after just half an hour, for example, the protective film may be subjected to a severe slipstream load (up to 160 km/h). Unlike straight EVAc adhesive compositions, on the other hand, the film may be removed from the finish without tearing, without employing excessive force. Moreover, even without application of a release layer, the protective film of the invention has an unwind force which is sufficiently low for the user, despite the strong adhesive.

The bond strength of the protective film of the invention to two-component polyurethane (2K PU) finishes is generally more than 0.4 in the fresh state and less than 2.8 N/cm following storage under alternating climatic conditions (in analogy to AFERA method 4001). Even exposure of the protective film to UV light in accordance with DIN 53387 1-A-X over 1 000 hours does not cause any deficiencies in the properties of the protective film: there is no embrittlement of the film and no residues of composition on removal.

Finally, the self-adhesive protective film of the invention may be produced in a particularly advantageous manner by coextrusion.

The protective film of the invention is therefore particularly suitable for protecting the fresh finish of automobiles during assembly or transit or as processing and transit protection for freshly painted surfaces, such as primarily for the protection of sensitive paint, metal, plastic or glass surfaces. The protective film can be bonded just half an hour after the painted surfaces have passed through the oven, without any disadvantages whatsoever, despite the fact that at this point in time the finish has not yet fully cured. A further feature of the protective film of the invention is that it can be applied in a large width over the hood, roof and trunk of automobiles and that, owing to its deformability, it conforms very well to planar and even gently curved surfaces. It is therefore possible to protect the horizontal surfaces which are most at risk from soiling. However, even narrow areas such as, for example, the projection of the door below the windows, the sill region, or bumpers can easily be covered. Protection of the vertical surfaces on the vehicle is particularly appropriate during its assembly. The protective film is resistant to sunlight, moisture, heat and cold, with weathering stability of at least six months. The addition of pigments such as titanium dioxide and of light stabilizers, in particular, leads to an improvement in UV stability of the protective film. Even very high sun levels, as are encountered in Florida, for example, do not cause the protective film to fail or detach. The extremely low UV permeability of the protective film prevents the adhesive being broken down by sun exposure.

Furthermore, the strength of the protective film in comparison to preservation with wax ensures impeccable protection against soiling such as bird droppings and against damage to the vehicle as a whole by minor mechanical events. It is possible to recycle the protective film or recover energy from it, in particular since it is halogen-free.

In the text below, the invention will be illustrated on the basis of examples which are not, however, intended to restrict the invention.

EXAMPLES

All of the films in the examples were produced by three-layer flat film coextrusion. Two of the three layers served as backing layer and adhesion promoter layer, respectively, and were not varied in their composition. Their compositions were as follows:

Backing layer (thickness 50 $\mu$m):
    60 parts of polypropylene block copolymers Daplen FFC 2012 (PCD)
    25 parts of polypropylene homopolymer Daplen KFC 201 (PCD)
    6.3 parts of LDPE Lupolen 1840 H (Elenac)
    8.4 parts of titanium dioxide
    0.3 parts of UV light stabilizer Tinuvin 770 (Ciba-Geigy)

Adhesion promoter layer (thickness 10 $\mu$m):
    50 parts of polypropylene block copolymer Daplen FFC 2012 (PCD)
    50 parts of EVAc copolymer Escorene Ultra UL 00728 (Exxon)

Exceptions were Examples 12 and 13, which had an identical backing layer and adhesion promoter layer on the basis of the backing layer composition, since the EVA/PP mixture was not a suitable adhesion promoter for the coextruded adhesive compositions.

The individual examples otherwise differed in each case in the coextruded pressure-sensitive adhesive compositions, in accordance with Table 1. Examples 10 to 13, marked in bold, are comparative examples. The layer thickness of the pressure-sensitive adhesive was 25 $\mu$m in each case.

TABLE 1

| | Pressure-sensitive adhesive compositions of the examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| EVAc 45[1] | 20 | 17.5 | 15 | 18.75 | 18.75 | 20 | | | | 25 | | | |
| EVAc 50[2] | | | | | | | 80 | 80 | 80 | | 100 | | |
| EVAc 70[3] | 60 | 52.5 | 45 | 56.25 | 56.25 | 60 | | | | 75 | | | |
| Buna EPG 2050[4] | 20 | 30 | 40 | | | | 20 | | | | | | |
| Buna EPG 3440[5] | | | | 25 | | | | 20 | | | | 100 | |
| Buna EPG 2470[6] | | | | | 25 | | | | | | | | |
| Vistanex MML 80[7] | | | | | | 20 | | 20 | | | | | 100 |

[1] EVAc with 45% by weight VAc content
[2] EVAc with 50% by weight VAc content
[3] EVAc with 70% by weight VAc content
[4] EPM amorphous (Bayer)
[5] EPDM amorphous (Bayer)
[6] EPDM partly crystalline (Bayer)
PIB (Exxon)

The specimens produced in this way were bonded over large areas to 1K PU-painted (Duraclear II, BASF), curved and beaded engine hoods. The specimens were assessed in accordance with the following criteria:
1. Bond strength to finish after 30 minutes at room temperature
2. Bond strength to finish after three days of storage at 90° C.
3. Deformation of the finish after three days of storage at 900C
4. Overall performance assessment Determination of the assessment criteria
1. and 2.:

The bond strengths in items 1 and 2 were measured at a peel angle of 180° and a peel rate of 300 mm/min and a temperature of 23° C.±1° C. and a relative atmospheric humidity of 50%±5% (in accordance with AFERA method 4001).

3.: The finish deformations at bonding edges, folds and blisters were assessed visually on a scale where 1=not evident, 2=very slightly pronounced, 3=slightly pronounced, 4=moderately pronounced, and 5=strongly pronounced.

4.: The overall performance assessment expresses a recommendation as to whether a protective film is suitable for the long-term protection of a fresh finish.

Table 2 summarizes the results.

TABLE 2

Assessment results of the various specimens in accordance with performance criteria

| Example | Bond strength to finish (N/cm) after 30 min RT | Bond strength to finish (N/cm) after 3 d 90° C. | Finish deformations Edge | Finish deformations Fold | Finish deformations Blister | Overall Assessment |
|---|---|---|---|---|---|---|
| 1 | 0.5 | 2.2 | 3 | 2 | 2 | sat. |
| 2 | 0.4 | 2.0 | 3 | 2 | 2 | sat. |
| 3 | 0.3 | 1.7 | 2 | 2 | 2 | sat. |
| 4 | 0.4 | 2.2 | 3 | 2 | 2 | sat. |
| 5 | 0.3 | 2.0 | 3 | 2 | 2 | sat. |
| 6 | 0.5 | 2.4 | 3 | 2 | 2 | sat. |
| 7 | 0.4 | 2.1 | 3 | 2 | 2 | sat. |
| 8 | 0.4 | 2.1 | 3 | 2 | 2 | sat. |
| 9 | 0.5 | 2.4 | 3 | 2 | 2 | sat. |
| 10 | 0.4 | 3.2 | 4 | 3 | 4 | unsat. |
| 11 | 0.4 | 3.0 | 4 | 3 | 3 | unsat. |
| 12 | <0.05 | cohesive fracture | 2[1] | 2[1] | 3[1] | unsat. |
| 13 | 0.05 | 2.4 | 2 | 2 | 2 | unsat. |

[1] after washing off the adhesive composition
Abbreviations: RT = room temperature, d = days, sat. = satisfactory, unsat. = unsatisfactory Discussion Examples 1 to 9 show good immediate bond strengths, which prevented the film from automatically becoming detached when bonded under tension and in the beads. The demasking of the specimens which under the hot conditions had increased to the final bond strength required a moderate application of force and was possible without tearing the film. The finish deformations produced at unavoidable film edges, folds and air bubbles were at an acceptable level. Overall, all of Examples 1 to 9 were assessed as appropriate for use.

Although specimens 10 and 11 likewise had a good initial bond strength, they were removable only with difficulty after temperature treatment, and the film tore partly during their removal. The finish deformations were more strongly pronounced than in the case of Examples 1 to 9 and were barely acceptable. Overall, from a performance standpoint, the specimens were not recommendable.

Example 12, although it did adhere to the finished metal, had virtually no measurable initial bond strength. After peel increase under the hot conditions, the composition split owing to inadequate cohesion, and so left residues of composition over large areas. Following the removal of the residues of composition using hexane, deformations were found at a better level than in the case of specimens 1 to 11.

Specimen 13 had a poor initial adhesion similar to that of specimen 12, but otherwise underwent a good increase and lent itself well to demasking in one piece. The finish deformations were very slight. The weak initial adhesion, however, resulted in the overall assessment being negative.

What is claimed is:

1. A self-adhesive protective film having a single-ply or multi-ply backing layer and an adhesive layer, the adhesive layer comprising a polar component A and an apolar component B, the weight fraction of the polar component A being from 50 to 99% and comprising one or a mixture of copolymers of ethylene and vinyl acetate whose vinyl acetate content is between 40 and 80% by weight, and the weight fraction of the apolar component B being from 1 to 50% and comprising one or a mixture of slightly crystalline or amorphous homopolymers or copolymers of α-olefins of 2 to 12 to carbon atoms, said polymers being saturated in the main chain.

2. A self-adhesive protective film having a single-ply or multi-ply backing layer and an adhesive layer,
the adhesive layer comprising a polar component A and an apolar component B, the weight fraction of the polar component A being from 50% to 99% and comprising one or a mixture of copolymers of ethylene and vinyl acetate whose vinyl acetate content is between 40 and 80% by weight, and
the weight fraction of the apolar component B being from 1 to 50% and comprising copolymers of α-olefins of 2 to 12 carbon atoms and nonconjugated dienes.

3. The self-adhesive protective film as claimed in claim 1 or 2, wherein the vinyl acetate fraction in the polar component A is from 50 to 70% by weight.

4. The self-adhesive protective films according to claim 1 or 2, wherein the backing layer comprises thermoplastic polyolefin film which is unoriented.

5. The self-adhesive protective film according to claim 4, wherein the backing layer comprises at least one polyolefin from the group consisting of polyethylenes, polypropylenes and combinations thereof.

6. The self-adhesive protective film according to claim 1 or 2, wherein the backing layer comprises at least one light stabilizer in an amount of at least 0.15% by weight.

7. The self-adhesive protective film according to claim 1 or 2, wherein the UV permeability of the protective film in the wavelength region from 290 to 360 nm is less than 1%.

8. The self-adhesive protective film according to claim 1 or 2, wherein the thickness of the backing layer is between 20 and 80 μm, optionally including an adhesion promoter layer which is disposed between the backing layer and the adhesive layer.

9. A method for protecting painted, metal, plastic or glass surfaces which comprises covering said surfaces with the protective film of claim 1 or 2.

10. A process for producing the self-adhesive protective film of claim 1 or 2, wherein the self-adhesive protective film is produced by coextrusion.

11. The method of claim 9 wherein said surfaces are the surfaces of automobiles or automobile parts.

* * * * *